US011313280B2

(12) United States Patent
Wusatowska-Sarnek et al.

(10) Patent No.: US 11,313,280 B2
(45) Date of Patent: Apr. 26, 2022

(54) GAS TURBINE ENGINE INCLUDING SEAL ASSEMBLY WITH ABRADABLE COATING AND CUTTER

(71) Applicant: Raytheon Technologies Corporation, Farmington, CT (US)

(72) Inventors: Agnieszka M. Wusatowska-Sarnek, Manchester, CT (US); Pantcho P. Stoyanov, West Hartford, CT (US); Thomas D. Kasprow, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 11 days.

(21) Appl. No.: 16/930,412

(22) Filed: Jul. 16, 2020

(65) Prior Publication Data

US 2022/0018290 A1 Jan. 20, 2022

(51) Int. Cl.
*F02C 7/06* (2006.01)
*F02C 7/28* (2006.01)

(52) U.S. Cl.
CPC .............. *F02C 7/28* (2013.01); *F02C 7/06* (2013.01); *F05D 2220/32* (2013.01); *F05D 2240/50* (2013.01); *F05D 2240/55* (2013.01)

(58) Field of Classification Search
CPC .......... F02C 7/28; F02C 7/06; F05D 2220/32; F05D 2240/50; F05D 2240/55; F01D 25/183; F01D 25/186; F01D 25/162
See application file for complete search history.

(56) References Cited

U.S. PATENT DOCUMENTS

| | | | | | |
|---|---|---|---|---|---|
| 1,872,251 | A | * | 8/1932 | Cowin | F16C 33/80 384/480 |
| 3,068,016 | A | * | 12/1962 | Dega | F16J 15/3496 277/406 |
| 3,342,563 | A | * | 9/1967 | Butts | B22F 3/1112 75/246 |
| 3,547,455 | A | * | 12/1970 | Daunt | F01D 11/02 277/415 |
| 4,248,566 | A | * | 2/1981 | Chapman | F04D 27/0215 415/26 |
| 4,277,072 | A | * | 7/1981 | Forch | F16J 15/164 277/404 |

(Continued)

FOREIGN PATENT DOCUMENTS

| | | |
|---|---|---|
| DE | 102017130965 A1 | 6/2019 |
| GB | 2401409 A | 11/2004 |
| RU | 2570027 C2 | 10/2015 |

*Primary Examiner* — J. Todd Newton, Esq.
*Assistant Examiner* — Theodore C Ribadeneyra
(74) *Attorney, Agent, or Firm* — Carlson, Gaskey & Olds, P.C.

(57) ABSTRACT

A gas turbine engine according to an exemplary aspect of this disclosure includes, among other things, a compressor section, a combustor section, a turbine section, and at least one rotatable shaft. The gas turbine engine further includes a seal assembly including a static structure and a rotatable structure configured to meet to form a contact area. The seal assembly includes an abradable coating on one of the static structure and the rotatable structure, and the seal assembly further includes a cutter on the other of the static structure and the rotatable structure.

19 Claims, 4 Drawing Sheets

(56) References Cited

U.S. PATENT DOCUMENTS

| | | | | |
|---|---|---|---|---|
| 4,402,515 | A | * | 9/1983 | Malott .................... F16J 15/445 277/415 |
| 4,423,097 | A | * | 12/1983 | Mons ....................... C22C 32/00 277/415 |
| 4,606,378 | A | * | 8/1986 | Meyer ..................... F16L 1/123 138/103 |
| 5,499,901 | A | * | 3/1996 | Rockwood ............ F04D 29/061 277/412 |
| 6,073,358 | A | | 6/2000 | Nguyen |
| 6,113,482 | A | | 9/2000 | Licata |
| 6,338,578 | B1 | * | 1/2002 | Adde ..................... F01D 25/162 384/537 |
| 6,443,698 | B1 | * | 9/2002 | Corattiyil ................. F01D 25/16 384/581 |
| 7,025,356 | B1 | * | 4/2006 | Cheung .................. F16J 15/445 277/303 |
| 7,998,604 | B2 | * | 8/2011 | Reynolds ................ C23C 30/00 428/701 |
| 8,794,922 | B2 | * | 8/2014 | Bart ....................... F01D 25/162 416/170 R |
| 10,180,075 | B1 | | 1/2019 | Andrus et al. |
| 11,060,382 | B2 | * | 7/2021 | Sherman ................. E21B 29/10 |
| 2002/0192494 | A1 | | 12/2002 | Tzatzov et al. |
| 2004/0137259 | A1 | * | 7/2004 | Pabla ....................... C23C 24/10 428/650 |
| 2004/0142196 | A1 | * | 7/2004 | Hajmrle .................. B22F 1/007 428/545 |
| 2006/0251512 | A1 | * | 11/2006 | Singh ..................... F01D 25/183 415/174.5 |
| 2006/0267289 | A1 | * | 11/2006 | Li .......................... F16J 15/445 277/347 |
| 2007/0177936 | A1 | * | 8/2007 | Servant .................... F02C 7/36 403/118 |
| 2008/0056890 | A1 | * | 3/2008 | Ivakitch ................. F01D 11/003 415/174.4 |
| 2009/0223052 | A1 | | 9/2009 | Chaudhry et al. |
| 2009/0297083 | A1 | * | 12/2009 | Raberin .................... F02C 7/06 384/537 |
| 2010/0135785 | A1 | * | 6/2010 | Just .......................... F02C 6/12 415/229 |
| 2011/0049809 | A1 | * | 3/2011 | Garrison ............... F01D 25/183 277/304 |
| 2011/0076151 | A1 | | 3/2011 | Cui et al. |
| 2011/0081235 | A1 | * | 4/2011 | Shah ........................ F03G 7/06 415/170.1 |
| 2011/0121519 | A1 | * | 5/2011 | Justak .................... F01D 11/025 277/412 |
| 2011/0293958 | A1 | * | 12/2011 | Benkoski ............ C08G 18/755 428/560 |
| 2013/0078079 | A1 | * | 3/2013 | LaPierre ................. F01D 25/16 415/110 |
| 2013/0241153 | A1 | * | 9/2013 | Garrison .................. F16J 15/40 277/350 |
| 2013/0283757 | A1 | * | 10/2013 | Bordne .................. F01D 25/125 60/39.08 |
| 2013/0305684 | A1 | * | 11/2013 | Mastro .................. F01D 11/003 60/39.092 |
| 2014/0099188 | A1 | * | 4/2014 | Bordne .................. F01D 25/183 415/112 |
| 2014/0300058 | A1 | * | 10/2014 | Brunet .................... F01D 11/02 277/351 |
| 2014/0334913 | A1 | * | 11/2014 | Igel ......................... F01D 11/04 415/110 |
| 2015/0176425 | A1 | | 6/2015 | Caulfield et al. |
| 2015/0184531 | A1 | * | 7/2015 | Baptista ................. F01D 25/16 415/230 |
| 2015/0233255 | A1 | * | 8/2015 | Strock ................... F01D 11/122 60/805 |
| 2015/0275677 | A1 | | 10/2015 | Cui et al. |
| 2015/0308281 | A1 | * | 10/2015 | Strock ................... F01D 11/127 415/173.4 |
| 2015/0354081 | A1 | * | 12/2015 | Strock .................. C25D 11/022 416/1 |
| 2015/0377037 | A1 | | 12/2015 | Salm et al. |
| 2016/0003092 | A1 | * | 1/2016 | Chamberlain .......... C04B 41/52 428/331 |
| 2016/0084168 | A1 | * | 3/2016 | Amini ...................... B22F 7/08 415/173.1 |
| 2016/0305442 | A1 | * | 10/2016 | Strock ..................... F01D 5/282 |
| 2016/0312897 | A1 | * | 10/2016 | Eastman ................ F16J 15/444 |
| 2017/0248029 | A1 | | 8/2017 | Hafner et al. |
| 2017/0314468 | A1 | * | 11/2017 | Wotzak ..................... F02C 3/04 |
| 2017/0314566 | A1 | * | 11/2017 | Strock ................... F04D 29/325 |
| 2017/0314567 | A1 | * | 11/2017 | Hansen ..................... F02C 3/04 |
| 2017/0314571 | A1 | * | 11/2017 | Strock ..................... F01D 5/20 |
| 2017/0343111 | A1 | * | 11/2017 | Ottow ................. F16C 33/6685 |
| 2018/0087669 | A1 | * | 3/2018 | Saha ....................... F01D 11/08 |
| 2018/0258783 | A1 | * | 9/2018 | Kirchhoff ................ C23C 4/01 |
| 2018/0291814 | A1 | * | 10/2018 | Anglin ................. F16C 33/768 |
| 2018/0340439 | A1 | * | 11/2018 | Vinski .................... F01D 25/183 |
| 2018/0361471 | A1 | * | 12/2018 | Stoyanov ............. B22F 1/0059 |
| 2019/0040959 | A1 | | 2/2019 | Sommers |
| 2019/0093496 | A1 | * | 3/2019 | Hardikar .............. F16J 15/4476 |
| 2019/0186281 | A1 | * | 6/2019 | Stoyanov ............. F01D 25/005 |

* cited by examiner

GAS TURBINE ENGINE INCLUDING SEAL ASSEMBLY WITH ABRADABLE COATING AND CUTTER

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. The bearings require lubricant. Various seal assemblies near the rotating shafts contain oil within bearing compartments. Specifically, during operation of the engine, non-rotating seal faces contact rotating seal plates to maintain bearing compartment pressures and keep lubricating oil inside the various bearing compartments.

SUMMARY

A gas turbine engine according to an exemplary aspect of this disclosure includes, among other things, a compressor section, a combustor section, a turbine section, and at least one rotatable shaft. The gas turbine engine further includes a seal assembly including a static structure and a rotatable structure configured to meet to form a contact area. The seal assembly includes an abradable coating on one of the static structure and the rotatable structure, and the seal assembly further includes a cutter on the other of the static structure and the rotatable structure.

In a further non-limiting embodiment of the foregoing gas turbine engine, the cutter is one of a plurality of cutters circumferentially spaced-apart from one another about the other of the static structure and the rotatable structure.

In a further non-limiting embodiment of any of the foregoing gas turbine engines, the cutter includes one or more ridges.

In a further non-limiting embodiment of any of the foregoing gas turbine engines, the one or more ridges are machined into the other of the static structure and the rotatable structure.

In a further non-limiting embodiment of any of the foregoing gas turbine engines, the one or more ridges are spaced-apart along a length of the cutter.

In a further non-limiting embodiment of any of the foregoing gas turbine engines, the abradable coating is positioned such that, in normal operating conditions, the cutter does not contact the abradable coating.

In a further non-limiting embodiment of any of the foregoing gas turbine engines, the abradable coating is positioned such that, in a worn seal condition, the cutter contacts the abradable coating and releases at least some magnetic particles of the abradable coating.

In a further non-limiting embodiment of any of the foregoing gas turbine engines, the abradable coating is a sacrificial coating.

In a further non-limiting embodiment of any of the foregoing gas turbine engines, the abradable coating is positioned on the rotatable structure and, in normal operating conditions, the abradable coating is radially outward of the contact area.

In a further non-limiting embodiment of any of the foregoing gas turbine engines, the cutter is radially outward of the contact area.

In a further non-limiting embodiment of any of the foregoing gas turbine engines, the static structure includes a seal carrier and a face seal supported by the seal carrier.

In a further non-limiting embodiment of any of the foregoing gas turbine engines, the rotatable structure is a seal plate.

In a further non-limiting embodiment of any of the foregoing gas turbine engines, a bearing assembly mounted relative to the rotatable shaft. The seal assembly is adjacent the bearing assembly.

In a further non-limiting embodiment of any of the foregoing gas turbine engines, the face seal is made of a carbon material.

A bearing compartment for a gas turbine engine according to another exemplary aspect of the present disclosure includes, among other things, a bearing assembly, and a seal assembly including a static structure and a rotatable structure configured to meet to form a contact area. The seal assembly further includes an abradable coating on one of the static structure and the rotatable structure, and a cutter on the other of the static structure and the rotatable structure.

In a further non-limiting embodiment of the foregoing bearing compartment, the cutter is one of a plurality of cutters circumferentially spaced-apart from one another about the other of the static structure and the rotatable structure.

In a further non-limiting embodiment of any of the foregoing bearing compartments, the cutter includes one or more ridges machined into the other of the static structure and the rotatable structure.

In a further non-limiting embodiment of any of the foregoing bearing compartments, the abradable coating is positioned such that, in normal operating conditions, the cutter does not contact the abradable coating. Further, the abradable coating is positioned such that, in a worn seal condition, the cutter contacts the abradable coating and releases at least some magnetic particles of the abradable coating.

In a further non-limiting embodiment of any of the foregoing bearing compartments, the abradable coating is a sacrificial coating.

In a further non-limiting embodiment of any of the foregoing bearing compartments, the static structure includes a seal carrier and a face seal supported by the seal carrier, and the rotatable structure is a seal plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
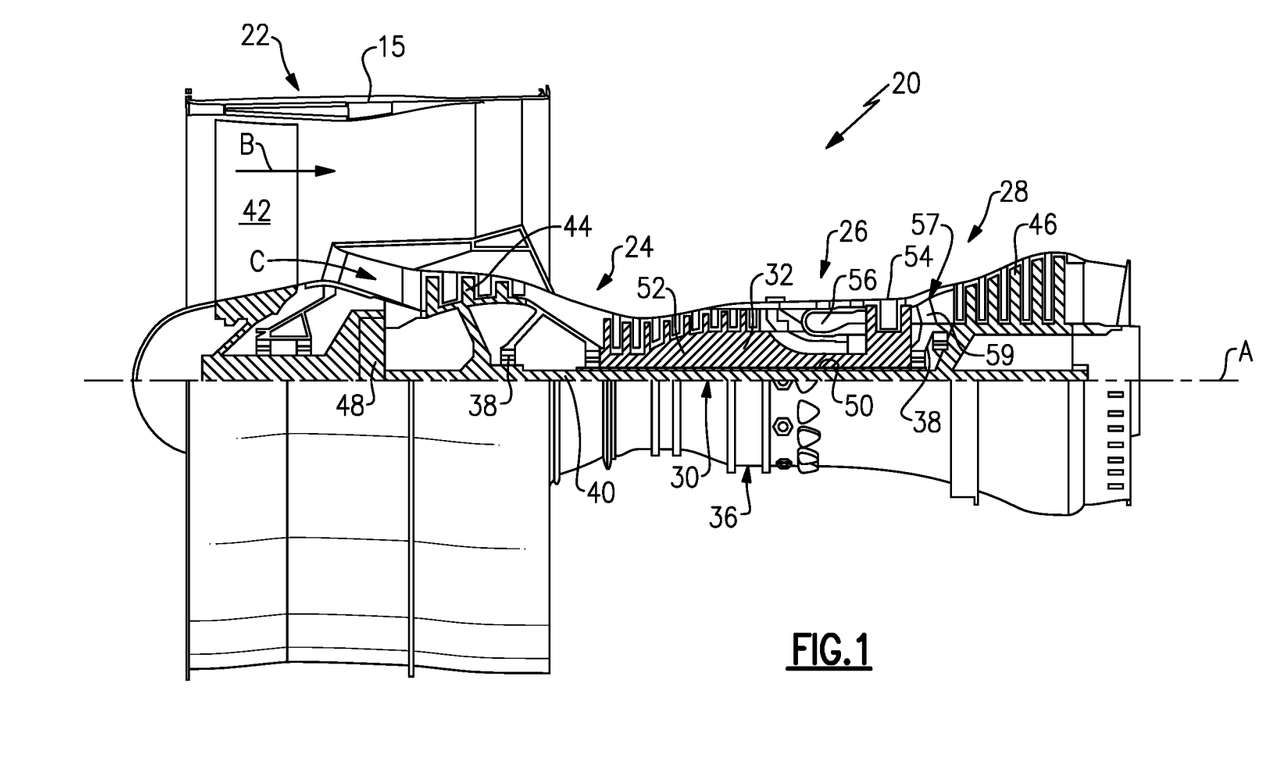
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

Figure 2:
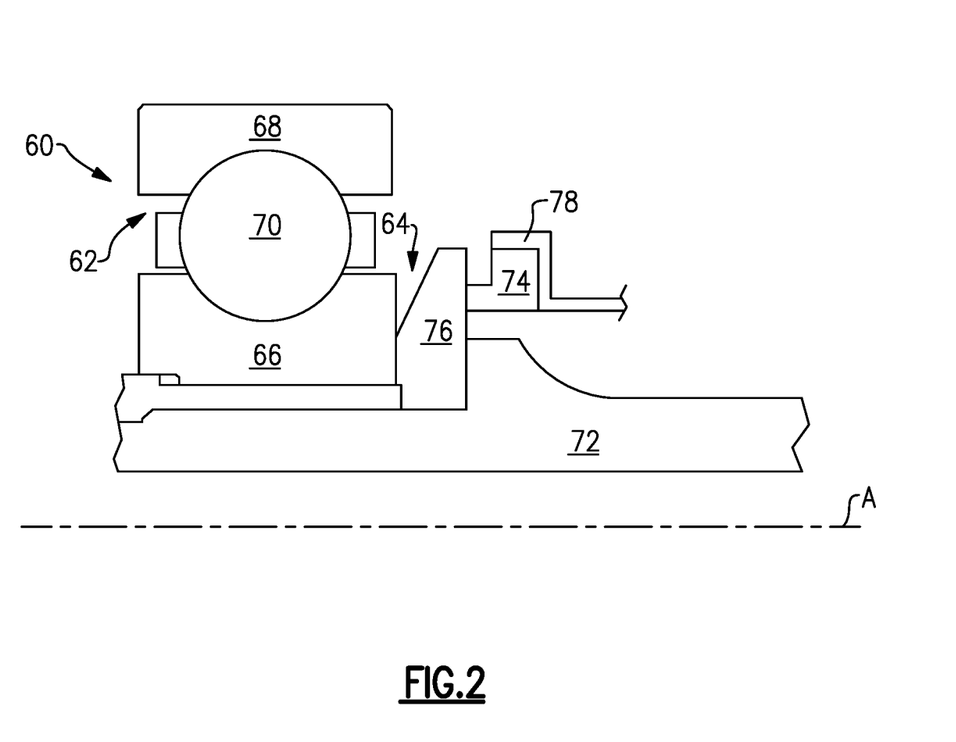
FIG. 2 illustrates a portion of the engine, and in particular illustrates a portion of a bearing compartment, including a bearing assembly and a seal assembly.

FIG. 2 is a partial cross-sectional view of a bearing compartment 60 of the engine 20. While described relative to the engine 20, this disclosure extends to other gas turbine engines other than the one shown in FIG. 1, and also extends to other rotation apparatuses such as power generators. The bearing compartment 60 includes a bearing assembly 62 and a seal assembly 64 adjacent the bearing assembly 62. As is known in the art, the bearing assembly 62 includes an inner race 66, an outer race 68, and rolling elements, such as balls, 70 configured to roll therebetween. The bearing assembly 62 is mounted relative to a shaft 72 of the engine 20.

The bearing compartment 60 is representative of any bearing compartment within the engine 20. Further, the shaft 72 is representative of any shaft within the engine 20, such as the inner shaft 40 or the outer shaft 50. This disclosure is not limited to bearing compartments at any particular engine location. Further, this disclosure applies outside the context of bearing compartments.

The seal assembly 64 includes a face seal 74 and a seal plate 76. In this example, the face seal 74 is mounted to a static structure, namely a seal carrier 78, and therefore does not rotate during operation of the engine 20. The seal plate 76 is a rotatable structure and thus rotates during operation of the engine 20. The face seal 74 may be made of a carbon (C) material, however other materials come within the scope of this disclosure.

The face seal 74 is biased against, and in direct contact with, the seal plate 76. In particular, either the seal carrier 78 itself is configured to bias the face seal 74 axially toward the seal plate 76, or another structure biases the seal carrier 78, and in turn the face seal 74, axially toward the seal plate 76.

The seal plate 76 is configured to rotate about the engine central longitudinal axis A with the shaft 72. The contact area, namely the region where the face seal 74 directly contacts the seal plate 76, between the face seal 74 and the seal plate 76 ensures that cooling fluid, namely lubricant such as oil, remains within the bearing compartment 60 during operation of the gas turbine engine 20. Over time, the face seal 74 and/or the seal plate 76 may wear. This disclosure relates to detection of such wear. In particular, this disclosure relates to an abradable coating that permits detection of undue wear at the interface between the face seal 74 and/or the seal plate 76.

Figure 3:
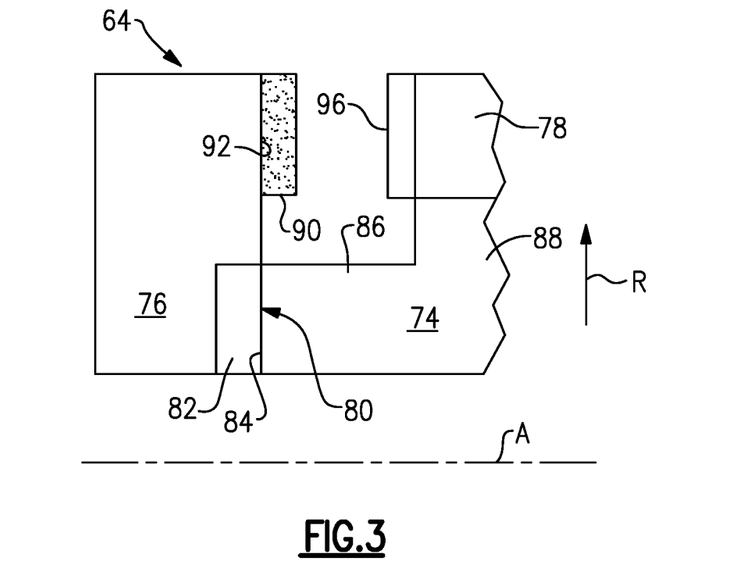
FIG. 3 is a close-up view of the portion of the engine, and in particular illustrates the seal assembly in a normal operating condition.

FIG. 3 is a close-up view of a portion of the bearing compartment 60, and illustrates additional detail of the seal assembly 64. FIG. 3 is representative of a normal operating condition in which the seal plate 76 and the face seal 74 are in direct contact at a contact area 80 In this example, the seal plate 76 includes a hard coating 82, which may include a relatively hard ceramic material such as a chrome carbide ($Cr_3C_2$), and a relatively softer metallic phase such as Co, CoNi, nickel chrome (nichrome), or MCrAlY (where M is Co, Ni or Co/Ni). An example hard coating 82 is tungsten carbide-cobalt (WC—Co), where WC is the hard ceramic material and Co is the binder. The hard coating 82 is configured to directly contact a nose 84 of the face seal 74. The nose 84 is an axial end of a projection 86 of the face seal 74. The projection 86 projects axially toward the seal plate 76 from a main body 88 of the face seal 74. Specifically, the projection 86 projects axially beyond the seal carrier 78. The projection 86 has a radially smaller dimension than the main body 88 in this example, providing the face seal 74 with a backwards-L-shape in FIG. 3, however the projection 86 could have the same radial dimension as the main body 88. The term "radially" refers to the radial direction R, which is normal to the engine central longitudinal axis A. The main body 88 is in direct contact with and directly supported by the seal carrier 78.

Radially outward of the hard coating 82, the seal plate 76 includes an abradable coating 90. The abradable coating 90, in this example, is applied to an axial end face 92 of the seal plate 76. The axial end face 92 faces toward the face seal 74 and the seal carrier 78. The axial end face 92 is co-planar with, and axially aligned with, a surface of the seal plate 76 containing the hard coating 82 and contacting the nose 84. In this example, the abradable coating 90 projects axially from the axial end face 92 in a direction toward the face seal 74 and the seal carrier 78. The abradable coating 90 is arranged on the seal plate 76 radially outward of the projection 86 such that the face seal 74 does not contact the abradable coating 90 during normal operating conditions. In other words, the contact area 80 is radially spaced-apart from, and in particular radially inward of, the abradable coating 90.

Figure 5A:
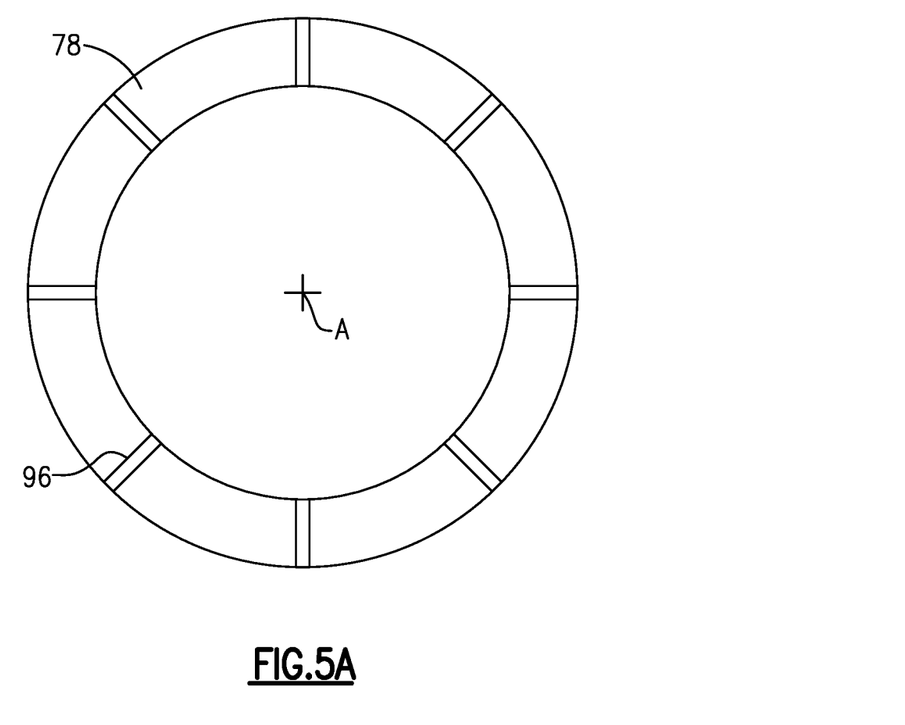
FIG. 5A illustrates a plurality of cutters arranged relative to a component of the engine.

The seal carrier 78, in this example, includes at least one cutter 96. In a further example, the seal carrier 78 includes a plurality of the cutters 96 spaced-apart from one another about the circumference of the seal carrier 78 (FIG. 5A). The cutter 96 is machined into an axial end face of the seal carrier 78. The seal carrier 78 may be machined down such that the cutter 96 projects axially from the remainder of the seal carrier 78. The cutter 96 may be integrally formed with the seal carrier 78. Alternatively, the cutter 96 could be formed separately from the seal carrier 78 and attached to the seal carrier 78 using a known attachment technique such as welding.

The cutter 96 faces toward the seal plate 76 and the abradable coating 90. As shown, the cutter 96 projects axially from the remainder of seal carrier 78 in a direction toward the seal plate 76 and the abradable coating 90. The cutter 96 is configured such that the cutter 96 does not contact the abradable coating 90 during normal operating conditions. The cutter 96 is radially aligned with the abradable coating 90 such that the cutter 96 is configured to contact the abradable coating 90 in a worn seal condition.

While in FIG. 3 the abradable coating 90 is on the seal plate 76, in another example the cutter 96 is on the seal plate 76 and in that example the abradable coating 90 would be applied to the seal carrier 78.

The cutter 96 can include a wear resistant coating in some examples. The wear resistant coating provides corrosion resistance and may be particularly useful if the abradable coating 90 is made of a relatively hard material. Example wear resistant coatings include WC—Co, WC—CoNi, CrC—NiCr, TiN, AlTiN, ta-C DLC, or DLC, among other possibilities.

Figure 4:
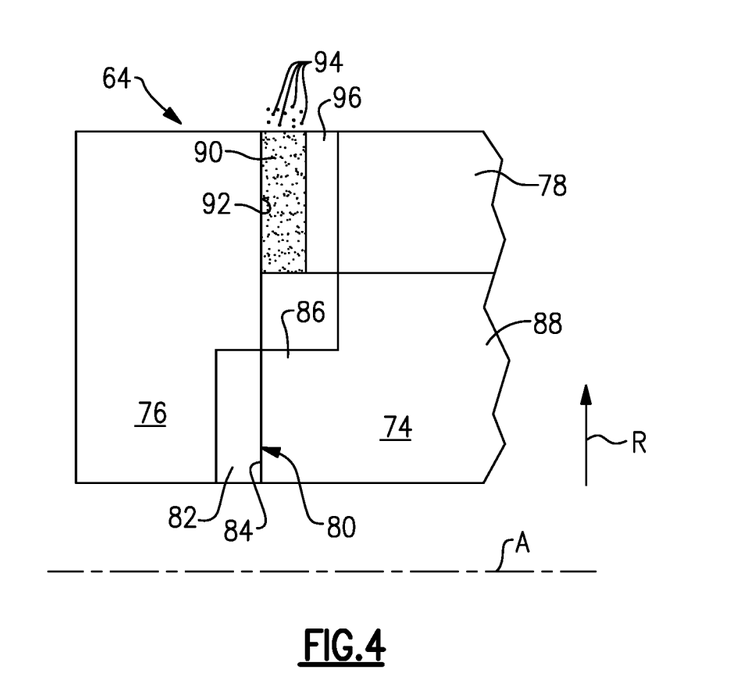
FIG. 4 is a close-up view of the portion of the engine, and in particular illustrates the seal assembly in a worn condition.

FIG. 4 is a view similar to FIG. 3, and illustrates the seal assembly 64 in a worn seal condition. In this condition, the face seal 74 has worn such that the projection 86 exhibits a smaller axial dimension than in FIG. 3. Under the above-discussed bias force, the seal carrier 78 is axially closer to the seal plate 76 in the worn seal condition of FIG. 4 than in FIG. 3. In particular, in FIG. 4, the face seal 74 has worn to a point where the cutter 96 is in direct contact with the abradable coating 90. The cutter 96 is configured such that contact with the abradable coating 90 causes some magnetic particles of the abradable coating 90 to become liberated or released from the remainder of the abradable coating 90. In this regard, the term cutter is used in this disclosure to refer to a structure that is configured to remove material from another structure.

In FIG. 4, a plurality of particles, illustrated at 94, have been freed from the remainder of the abradable coating 90 and have been released radially outwardly into the bearing compartment 60, where the freed particles 94 intermix with the lubricant in the bearing compartment 60. The abradable coating 90, and the freed particles 94, contains material which can be used by another system of the engine 20, such as an on-line detection monitor, which is a sensor configured to detect the presence of magnetic particles in oil, to determine that the seal assembly 64 has worn. Thus, the abradable coating 90 is not configured to resist release of such particles when brought into direct contact with the cutter 96. In this regard, the abradable coating 90 may be referred to as a sacrificial coating.

FIG. 5A an axial end view of the seal carrier 78. The seal carrier 78 includes a plurality of cutters 96 circumferentially spaced-apart from one another about the seal carrier 78. The cutters 96 are evenly spaced-apart from one another in this example. The cutters 96 could be arranged in a different manner relative to the seal carrier 78, however. Further, while a particular number of cutters 96 are shown in FIG. 5A, this disclosure extends to configurations with one or more cutters.

Figure 5B:
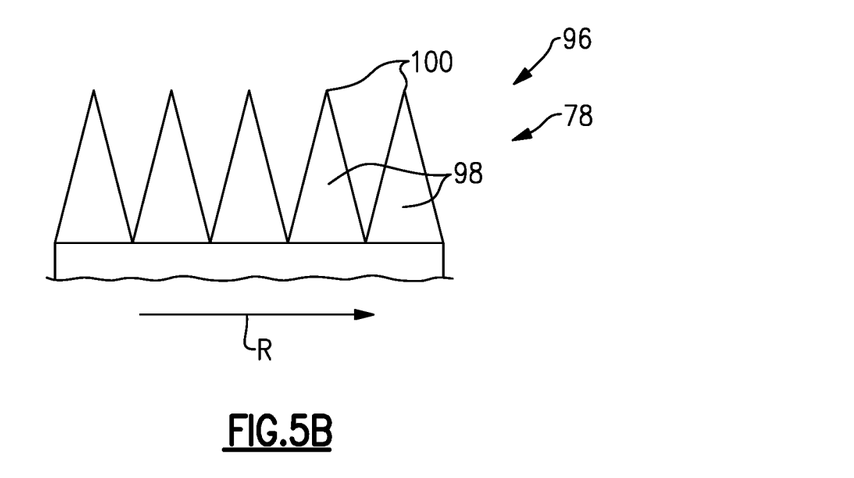
FIG. 5B illustrates additional detail of one of the cutters from FIG. 5A.

Each cutter 96 extends along its length from a radially inner dimension of the seal carrier 78 to a radially outer dimension of the seal carrier 78. In other words, the cutters 96 exhibit a length equal to a radial dimension of the seal carrier 78. The length of the cutters 96 could be smaller than the radial dimension of the seal carrier 78 in other examples. With reference to FIG. 5B, each cutter 96 includes a plurality of cutting elements. In FIG. 5B, the cutting elements are ridges 98. The ridges 98 are similarly sized and shaped in this example. In FIG. 5B, the ridges 98 may be pyramid-shaped, and may be triangular-shaped when viewed in cross-section. Other shapes come within the scope of this disclosure. In FIG. 5B, each ridge 98 is tapered to a free end 100, which in this example is a relatively sharp point. In the worn seal condition, the ridges 98 are configured to readily liberate the freed particles 94 from the remainder of the abradable coating 90.

While a particular number of ridges 98 are shown in FIG. 5B, the number of ridges 98 may vary. For instance, if a larger freed particle size is desired, the cutters 96 may include lesser ridges 98. On the other hand, increasing the number of ridges 98 may reduce the size of freed particles.

The abradable coating 90, in this disclosure, includes polymer material embedded with metallic or ceramic particles, namely magnetic particles. Alternatively, the abradable coating 90 may include magnetic particles which are not embedded in polymer. In either case, the cutters 96 are configured to release magnetic particles of the abradable coating 90 in a worn seal condition, and a sensor is configured to detect the presence of the freed particles in a lubricant system associated with the bearing compartment 60 to identify a worn seal condition. This disclosure promotes early detection of a worn seal condition compared to arrangements which do not include a cutter, for example.

It should be understood that terms such as "axial" and "radial" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms. Additionally, while many components of the engine 20 are shown in cross-section in the figures, it should be understood that certain of these components extend circumferentially around the engine central longitudinal axis A.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine comprising: a compressor section, a combustor section, a turbine section, and at least one rotatable shaft; and a seal assembly including a static structure and a rotatable structure configured to meet to form a contact area, wherein the seal assembly includes an abradable coating on one of the static structure and the rotatable structure, and wherein the seal assembly further includes a cutter on the other of the static structure and the rotatable structure, wherein, in normal engine operating conditions, the abradable coating and the cutter are adjacent the contact area and are radially outward of the contact area, and wherein, in normal engine operating conditions, an axial end face of a seal plate and an axial end face of a face seal are in direct contact at the contact area.

2. The gas turbine engine as recited in claim 1, wherein the cutter is one of a plurality of cutters circumferentially spaced-apart from one another about the other of the static structure and the rotatable structure.

3. The gas turbine engine as recited in claim 1, wherein the cutter includes one or more ridges.

4. The gas turbine engine as recited in claim 3, wherein the one or more ridges are machined into the other of the static structure and the rotatable structure.

5. The gas turbine engine as recited in claim 3, wherein the one or more ridges are spaced-apart along a length of the cutter.

6. The gas turbine engine as recited in claim 1, wherein the abradable coating is positioned such that, in normal engine operating conditions, the cutter does not contact the abradable coating.

7. The gas turbine engine as recited in claim 1, wherein the abradable coating is positioned such that, in a worn seal condition, the cutter contacts the abradable coating and releases at least some magnetic particles of the abradable coating.

8. The gas turbine engine as recited in claim 7, wherein the abradable coating is a sacrificial coating.

9. The gas turbine engine as recited in claim 8, wherein the abradable coating is positioned on the rotatable structure and, in normal engine operating conditions, the abradable coating is radially outward of the contact area.

10. The gas turbine engine as recited in claim 1, wherein the static structure includes a seal carrier and the face seal, wherein the face seal is supported by the seal carrier, and wherein the rotatable structure is the seal plate.

11. The gas turbine engine as recited in claim 1, further comprising:
a bearing assembly mounted relative to the rotatable shaft, wherein the seal assembly is adjacent the bearing assembly.

12. The gas turbine engine as recited in claim 1, wherein the face seal is made of a carbon material.

13. The gas turbine engine as recited in claim 1, wherein, in normal engine operating conditions: within the contact area, the axial end face of the seal plate and the axial end face of the face seal are both substantially planar, smooth surfaces, within the contact area, the axial end face of the seal plate is either an aft-most or a fore-most surface of the seal plate, and within the contact area, the axial end face of the face seal is either an aft-most or a fore-most surface of the face seal.

14. The gas turbine engine as recited in claim 7, further comprising a sensor configured to detect a presence of at least some of the released magnetic particles in lubricant.

15. A bearing compartment for a gas turbine engine, comprising: a bearing assembly; and a seal assembly including a static structure and a rotatable structure configured to meet to form a contact area, wherein the seal assembly includes an abradable coating on one of the static structure and the rotatable structure, and wherein the seal assembly further includes a cutter on the other of the static structure and the rotatable structure, wherein, in normal engine operating conditions, the abradable coating and the cutter are adjacent the contact area and are radially outward of the contact area, and wherein, in normal engine operating conditions, an axial end face of a seal plate and an axial end face of a face seal are in direct contact at the contact area.

16. The bearing compartment as recited in claim 15, wherein the cutter is one of a plurality of cutters circumferentially spaced-apart from one another about the other of the static structure and the rotatable structure.

17. The bearing compartment as recited in claim 16, wherein the cutter includes a plurality of ridges.

18. The bearing compartment as recited in claim 16, wherein: the abradable coating is positioned such that, in normal engine operating conditions, the cutter does not contact the abradable coating, and the abradable coating is positioned such that, in a worn seal condition, the cutter contacts the abradable coating and releases at least some magnetic particles of the abradable coating, and the abradable coating is a sacrificial coating.

19. The bearing compartment as recited in claim 16, wherein the static structure includes a seal carrier and the face seal, wherein the face seal is supported by the seal carrier, and wherein the rotatable structure is the seal plate.

* * * * *